(12) United States Patent  (10) Patent No.:     US 6,837,021 B2
Sudo                                                                 (45) Date of Patent:        Jan. 4, 2005

(54) DOOR FOR TICKET GATE (75) Inventor: Kunio Sudo, Tokyo (JP)

(73) Assignee: Kokushin Sangyo K.K., Tokyo (JP)

( * ) Notice: Subject to any disclaimer, the term of this patent is extended or adjusted under 35 U.S.C. 154(b) by 75 days.

(21) Appl. No.: 10/284,182

(22) Filed: Oct. 31, 2002

(65) Prior Publication Data

US 2004/0083666 A1 May 6, 2004

(51) Int. Cl.$^7$ ................................................ E06B 3/00
(52) U.S. Cl. .................... 52/784.1; 52/309.7; 52/309.9; 52/309.16; 49/501
(58) Field of Search .......................... 52/309.7, 309.8, 52/309.9, 309.16, 784.1; 49/104, 501

(56) References Cited

U.S. PATENT DOCUMENTS

| | | | | |
|---|---|---|---|---|
| 3,359,699 A | * | 12/1967 | Jackson | .................. 52/784.13 |
| 3,742,647 A | * | 7/1973 | Tomita | ........................... 49/35 |
| 3,854,263 A | * | 12/1974 | Eckel | ......................... 52/784.1 |
| 3,950,894 A | * | 4/1976 | DiMaio | ....................... 49/501 |
| 4,159,681 A | * | 7/1979 | Vandament | .............. 108/57.33 |
| 4,206,267 A | * | 6/1980 | Jungbluth | ................... 428/623 |
| 5,426,908 A | * | 6/1995 | Shayman | ................. 52/783.11 |
| 5,474,841 A | * | 12/1995 | Matsuki et al. | .......... 428/304.4 |
| 5,925,207 A | * | 7/1999 | Itoh et al. | ................... 156/216 |
| 6,389,769 B1 | * | 5/2002 | McKinney et al. | ........ 52/309.9 |

* cited by examiner

*Primary Examiner*—Brian E. Glessner
(74) *Attorney, Agent, or Firm*—Oblon, Spivak, McClelland, Maier & Neustadt, P.C.

(57) ABSTRACT

A door for a ticket gate is disclosed. The door is composed of a metal plate as a core material and a cushioning material covering the metal plate. The metal plate defines at least one through-hole therein. The cushioning material comprises expanded polyolefin plates, and the metal plate and the expanded polyolefin plates have been integrated together by arranging the polyolefin plates on opposite sides of the metal plate, respectively, and then press molding them together.

11 Claims, 12 Drawing Sheets

DOOR FOR TICKET GATE

FIELD OF THE INVENTION

This invention relates to a novel door for a ticket gate composed of a metal plate, for example, an iron plate as a core material and a cushioning material covering the metal plate. More specifically, this invention is concerned with a door for a ticket gate, which is lightweight and hence, does not cause much trouble on equipment of the ticket gate and permits easy maintenance of the equipment and further, which permits ready separation of a cushioning material from a metal plate to facilitate their recycling.

DESCRIPTION OF THE BACKGROUND

A number of automatic ticket gates are arranged at a railway station. Insertion of a ticket, pass or prepaid card into such an automatic ticket gate opens a door arranged at an end of the ticket gate or doors disposed at opposite ends of the ticket gate (only one door will hereinafter be referred to for the sake of brevity in description) so that boarding of a train without a valid ticket, pass or prepaid card can be prevented.

The door for the ticket gate is obviously required to be equipped not only with sufficient strength but also with safety to passengers, so that a metal plate as a core material is covered at a surface thereof with a cushioning material of substantial thickness. This metal plate may hereinafter be called "an iron plate" as a typical example. It has been a conventional practice to use polyurethane foam as such a cushioning material. As polyurethane resin is high in specific gravity and the cushioning material is required to have a certain degree of strength, the polyurethane foam has a low expansion ratio and as a consequence, the door becomes heavy. This door is opened and closed in accordance with magnetic information inputted in each ticket or the like and, when a prepaid card is used, the door is operated in association with a printer which serves to print a boarding record on the prepaid card. Since the door arranged at the ticket gate with such complex structures built therein as described above is heavy, the equipment in the ticket gate are often caused to develop troubles due to impacts exerted upon opening and closure of the door, resulting in a substantial cost for their repair.

The conventional door making use of polyurethane foam as a cushioning material is fabricated by providing an iron plate as a core material, placing the core material in a casting mold, and injecting two-pack urethane components into the mold and then forming polyurethane foam within the mold. The iron plate as the core material is provided with several through-holes to reduce its weight and also to fix the cushioning material thereon. The reacted polyurethane foam is firmly bonded on the surface of the iron plate, and further, fills up the through-holes of the iron plate. When the door is damaged or stained or otherwise becomes no longer suited for continued use and is replaced by a new door, it is desired to recycle the iron plate of the replaced door. In practice, however, its is extremely difficult to separate the iron plate and the polyurethane foam from each other because they are integrated together as described above. The door so replaced is, therefore, disposed of by land filling or the like, and no recycling has been materialized for the iron plate and polyurethane foam which are both valuable resources.

SUMMARY OF THE INVENTION

An object of the present invention is, therefore, to provide a door for a ticket gate, which is lightweight and hence, does not cause much trouble on equipment of the ticket gate and permits easy maintenance of the equipment and further, which permits ready separation of a cushioning material from a metal plate to facilitate their recycling.

The above-described object can be achieved the present invention to be described hereinafter. In one aspect of the present invention, there is thus provided a door for a ticket gate, said door being composed of a metal plate as a core material and a cushioning material covering the metal plate, wherein the metal plate defines at least one through-hole therein, the cushioning material comprises expanded polyolefin plates, and the metal plate and the expanded polyolefin plates have been integrated together by arranging the polyolefin plates on opposite sides of the metal plate, respectively, and then press molding the metal plate and the expanded polyolefin plates together.

According to the present invention, the door is lightweight so that equipment and the like at the ticket gate do not develop much trouble and their maintenance is easy. The cushioning material can be easily removed from the metal plate after replacement, so that recycling of the metal plate and the cushioning material is facilitated. For example, the metal plate so recovered can be used directly as a core material for a new door, while the expanded polyolefin plates as the cushioning material can be used as a resin material for a variety of molded or otherwise formed products.

DESCRIPTION OF THE PREFERRED EMBODIMENTS

The present invention will hereinafter be described in further detail based on certain preferred embodiments.

Figure 1:
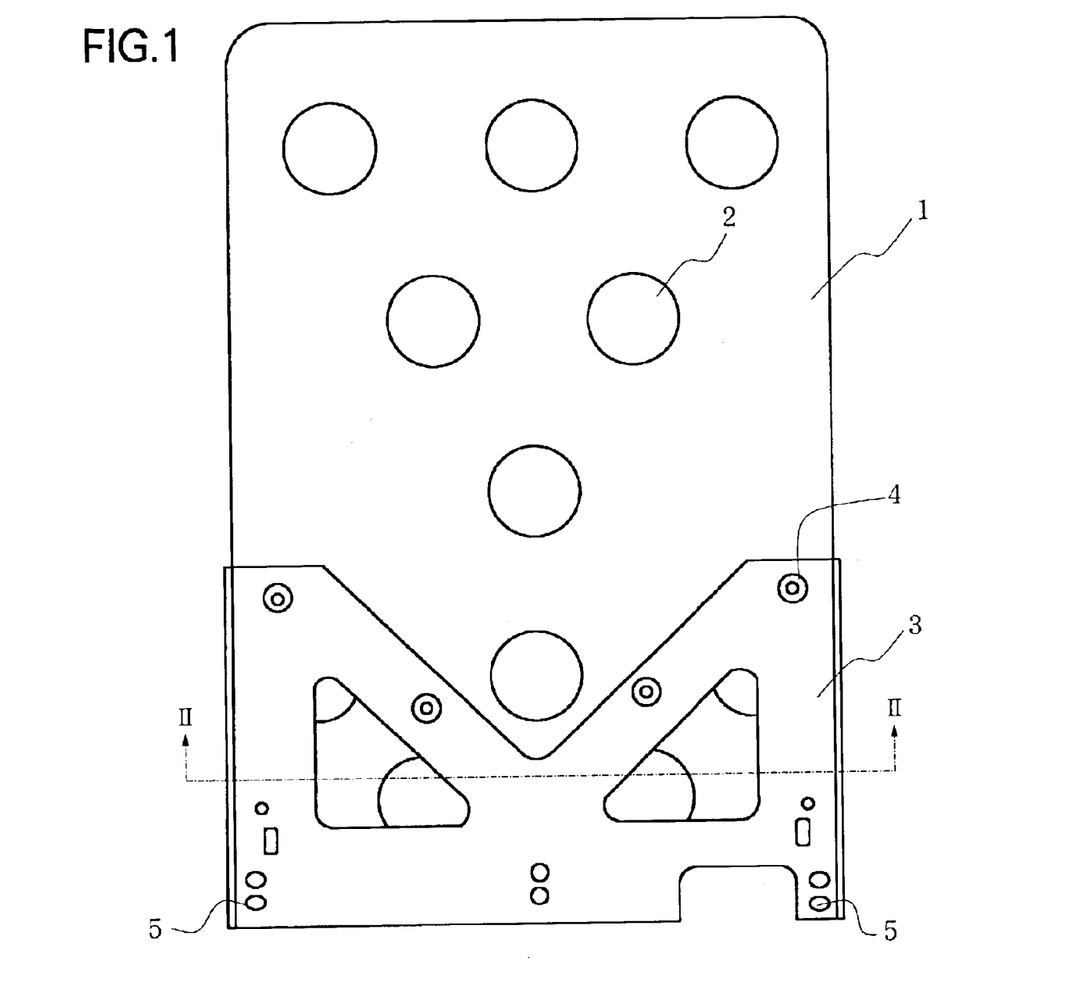
FIG. 1 is a plan view of an iron-made core material for use in the present invention.
Figure 2:
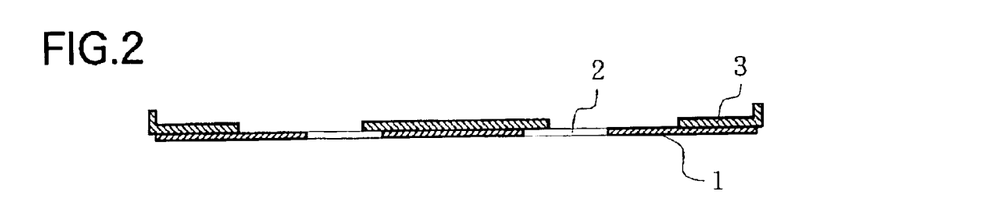
FIG. 2 is a cross-sectional view of the iron-made core material as viewed in the direction of II—II of FIG. 1.

Referring first to FIGS. 1 and 2, a description will be made of an iron plate as a typical example of the metal plate for use in the present invention. The iron plate designated generally at numeral 1 is a reinforcing material of one of two doors attached for opening and closure in the form of a biparting door to both sides of a ticket gate, so that the iron plate 1 has a substantially similar shape as the doors. The iron plate 1 is provided with at least one through-hole 2 to reduce its weight and also to prevent sliding of a below-described cushioning material from its right place. On and along one end (the lower end as viewed in the drawing) of the iron plate 1, a mounting iron plate 3 is arranged to mount the iron plate 1 on a door drive unit (not shown) of the ticket gate. The mounting iron plate 3 is fixedly secured on the iron plate 1 by suitable fastening means 4 such as self-tapping screws. The mounting iron plate 3 is provided at an end portion thereof (a lower end portion as viewed in the drawing) with plural self-tapping screw holes 5 for its mounting on the door drive unit arranged on the corresponding side of the ticket gate. It is to be noted that the illustrated example is merely one example of core materials of known doors and that the present invention is by no means limited to the use of this exemplified core material.

Figure 11:
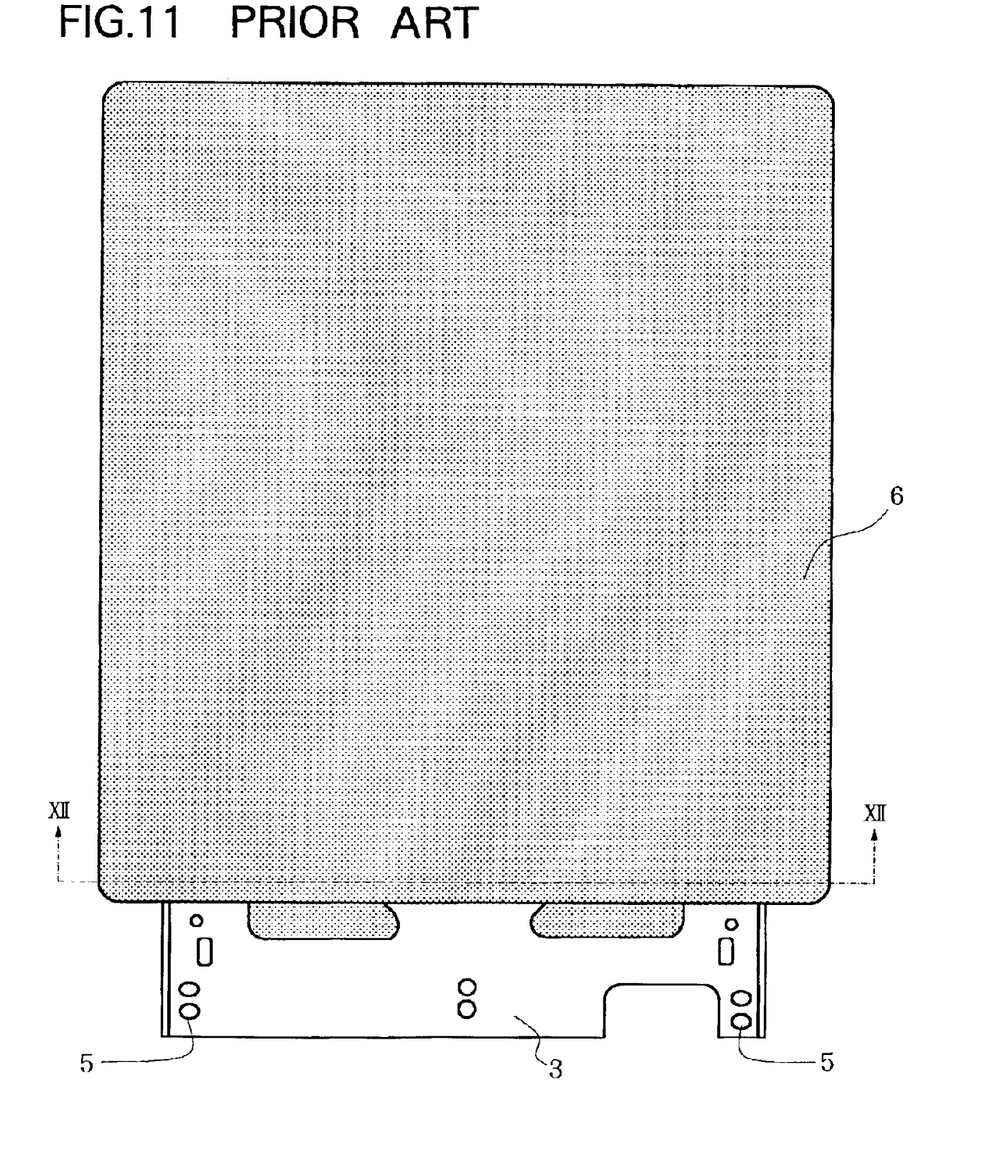
FIG. 11 is a plan view of a conventional door.

Referring next to FIGS. 11 an 12, a conventional door will be described. The conventional door has been fabricated by fixing the core material 1, which is shown in FIGS. 1 and 2, at a predetermined position in a casting mold for polyurethane molding, injecting a solution A (polyol) and a solution B (polyisocyanate) at the same time into the mold, and causing the solution A and the solution B to react and also causing the resulting polyurethane to expand such that a polyurethane foam 6 is formed as a cushioning material around the core material 1. Needless to say, a catalyst and blowing agent, which are needed for the reaction and expansion, respectively, are mixed in the solution A and/or the solution B. As the cushioning material 6 formed as described above is required to have a certain degree of surface strength, its expansion ratio is controlled low. Therefore, the door so obtained is heavy and is accompanied by the problem described above under the Description of the Background (problem 1).

Figure 12:
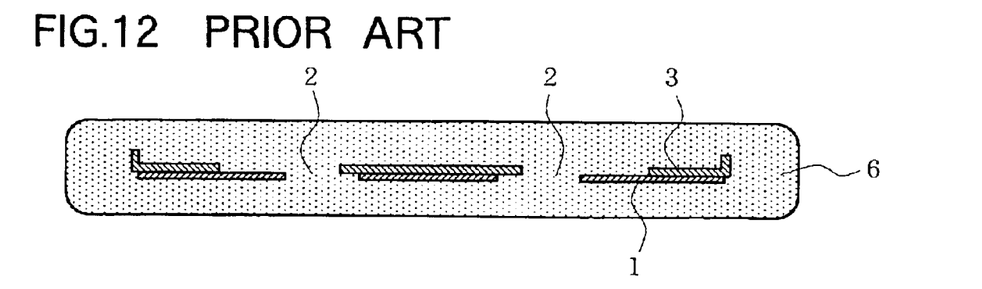
FIG. 12 is a cross-sectional view of the conventional door taken in the direction of arrows XII—XII of FIG. 11.

Reference is next had specifically to FIG. 12. In the conventional door, the polyurethane foam 6 with which the iron plate 1 is covered at both sides thereof is firmly bonded to the surfaces of the iron plate 1 and moreover, is continuous and integral in all the through-holes 2 of the iron plate 1. Even if one wishes to recycle the iron plate 1 and the polyurethane foam 6 subsequent to replacement of the door by a new door, it is extremely difficult to remove the cushioning material, that is, the polyurethane foam 6 from the iron plate 1 for the reasons mentioned above. Recycling of the iron plate 1 is hence practically impossible. Even if the polyurethane foam is separated by force, the polyurethane foam is not suited for recycling. Its incineration, however, raises another problem that noxious gas is given off (problem 2).

Figure 3:
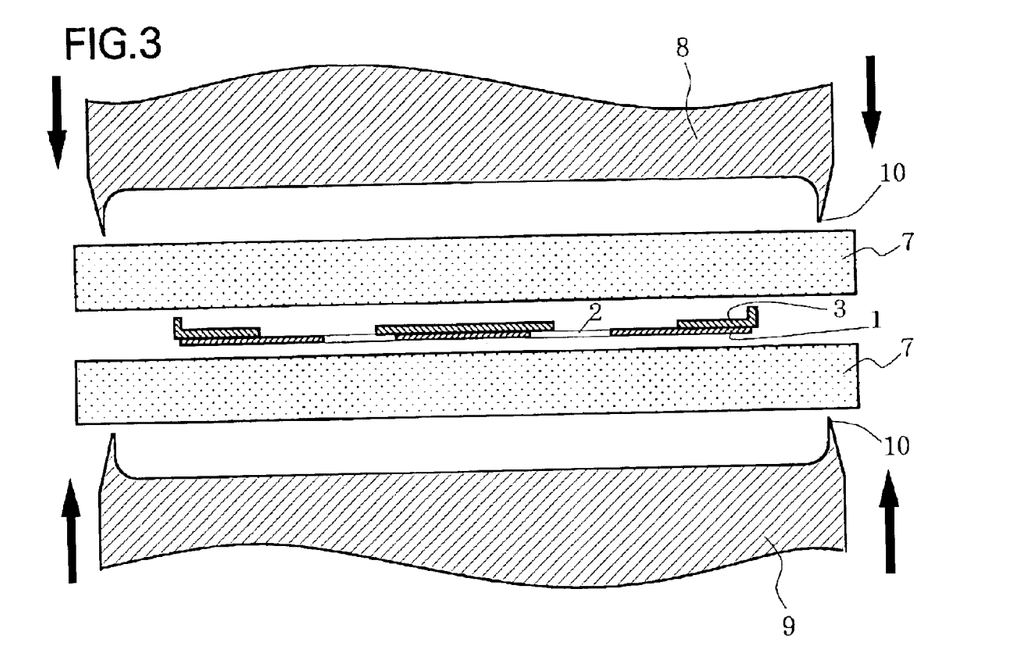
FIG. 3 is a cross-sectional view illustrating a fabrication process of a door according to a first embodiment of the present invention before press molding.
Figure 4:
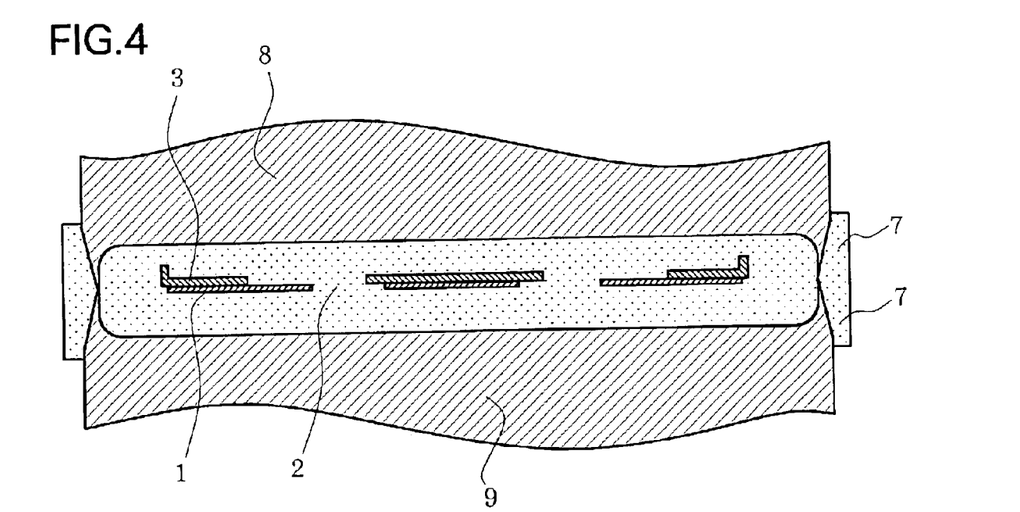
FIG. 4 is a cross-sectional view illustrating the fabrication process of the door according to the first embodiment of the present invention after press molding.

The present invention has made it possible to solve the above-described problem 1 and problem 2 at the same time. Constructions of doors according to the first and second embodiments of the present invention will now be described based on FIGS. 3 to 6 which illustrate fabrication of the doors. FIG. 3 illustrates a fabrication process of the door according to the first embodiment of the present invention, in which an iron plate 1 is the same as the iron plate 1 depicted in FIGS. 1 and 2. Firstly, expanded polyolefin plates 7, 7 are arranged above and below the iron plate 1, respectively. By a press molding apparatus equipped with a top force 8 and a bottom force 9, a laminate of the iron plate 1 and the expanded polyolefin plates 7, 7 is press molded under heat as illustrated in FIG. 4. A cavity which is formed by the top force 8 and bottom force 9 at this stage conforms in outer dimensions with the door. As depicted in FIG. 4, the combined shape of the expanded polyolefin plates 7,7 is brought into conformity with the external shape of the door and is fixed in that shape by the closure of the top force 8 and bottom force 9 under heat. Extra portions of the expanded polyolefin plates 7,7, said extra portions extending out of the top force 8 and bottom force 9 after their closure, are cut off by trimming knives 10,10 formed on and along peripheries of the top force 8 and bottom force 9.

By controlling the temperatures of the top and bottom forces at about 60 to 200° C. and maintaining the pressed state for about 5 to 30 minutes during the press molding, the upper and lower, expanded polyolefin plates 7,7 are formed into the predetermined shape and fixed in that shape by the top and bottom forces 8,9 and at the same time, are strongly compressed and heated in the neighborhood of the trimming knives 10,10. Accordingly, the upper and lower, expanded polyolefin plates 7,7 are firmly fusion-bonded and even after its removal from the top and bottom forces 8,9, the upper and lower, expanded polyolefin plates 7,7 do not separate from each other. At the interface between the upper and lower, expanded polyolefin plates 7,7 at areas other than the fusion-bonded area, on the other hand, the upper and lower, expanded polyolefin plates 7,7 are not fusion-bonded when the press molding temperature is relatively low, because the quantity of heat applied to such areas is smaller compared with that applied to the outer peripheral edge area. By setting the press molding temperature at a higher level, however, the upper and lower, expanded polyolefin plates 7,7 can be also fusion-bonded in the through-holes 2 to such an extent as permitting subsequent separation. When the door is replaced by a new door subsequent to its use over a certain period of time, the expanded polyolefin plates 7,7 can be easily separated from the iron plate 1 in the used door by simply cutting off the fusion-bonded, outer peripheral edge portions of the expanded polyolefin plates 7,7. Therefore, the iron plate 1 and the expanded polyolefin plates 7,7 can be easily recycled.

In the first embodiment illustrated in FIG. 4, the expanded polyolefin plates 7,7 are substantially not fusion-bonded to the corresponding surfaces of the iron plate 1 and are substantially not fusion-bonded together in the through-holes 2, when the press molding temperature is relatively low. When the expanded polyolefin plates 7,7 are substantially not fusion-bonded together in the through-holes 2 of the iron plate 1 as mentioned above, the door, depending upon its application field, may develop a problem during use such that the expanded polyolefin plates 7,7 may blister or otherwise bulge outwards or may undergo sagging.

Figure 5:
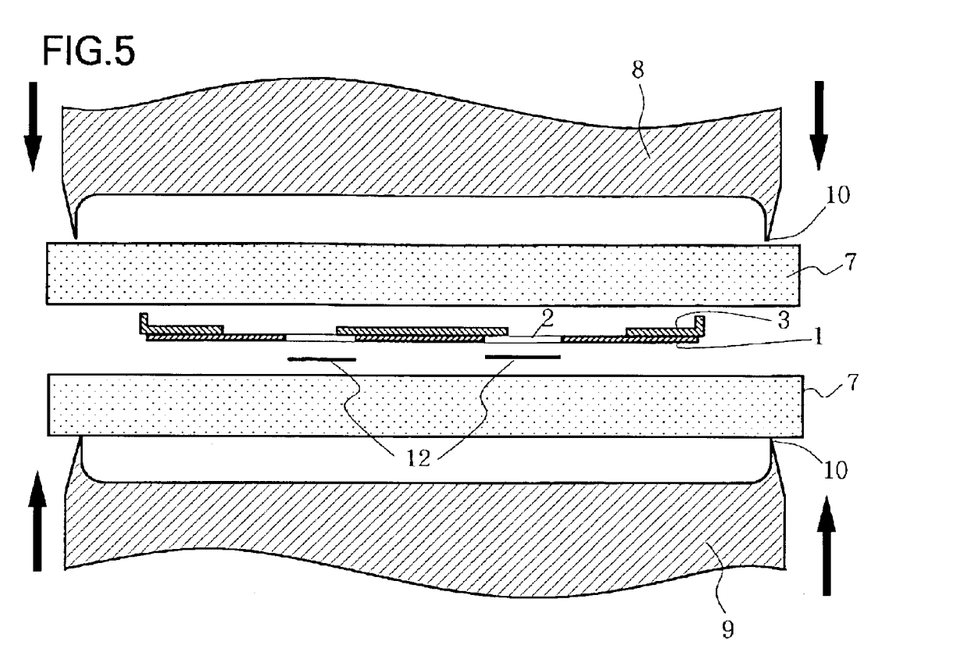
FIG. 5 is a cross-sectional view illustrating a fabrication process of a door according to a second embodiment of the present invention before press molding.
Figure 6:
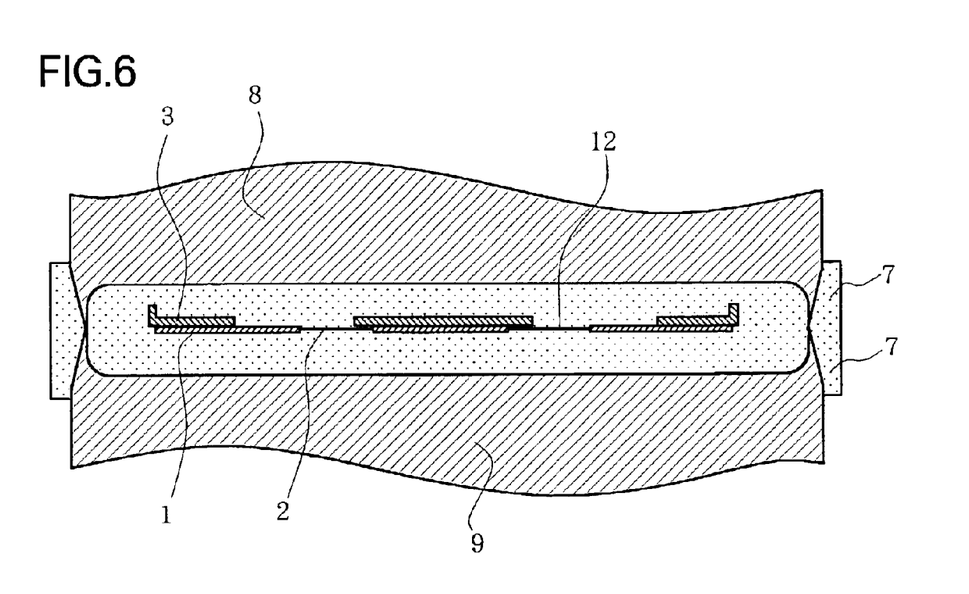
FIG. 6 is a cross-sectional view illustrating the fabrication process of the door according to the second embodiment of the present invention after press molding.

The second embodiment shown in FIGS. 5 and 6 has overcome the above-mentioned problem which may occur when the press molding temperature is relatively low. The second embodiment is different from the first embodiment illustrated in FIGS. 3 and 4 in that as depicted in FIG. 5, a uniting sheet or film 12 is held between the iron plate 1 and the lower expanded polyolefin plate 7 at a location corresponding to at least one of the through-holes 2 of the iron plate 4 and in a similar manner as in the first embodiment, press molding is then performed under heat as shown in FIG. 6. When press molding is conducted as described above, the two expanded polyolefin plates 7,7 are united together via the uniting sheet or film 12 in the area of the through-hole 2. As a result, the potential problem of blister or bulging or sagging in the above-described first embodiment can be solved and further, the bonding between the expanded polyolefin plates 7,7 and the iron plate 1 is weaker than that heretofore achieved from the use of polyurethane foam, thereby permitting easy separation of the cushioning material and ready recycling of the expanded polyolefin plates.

Figure 7:
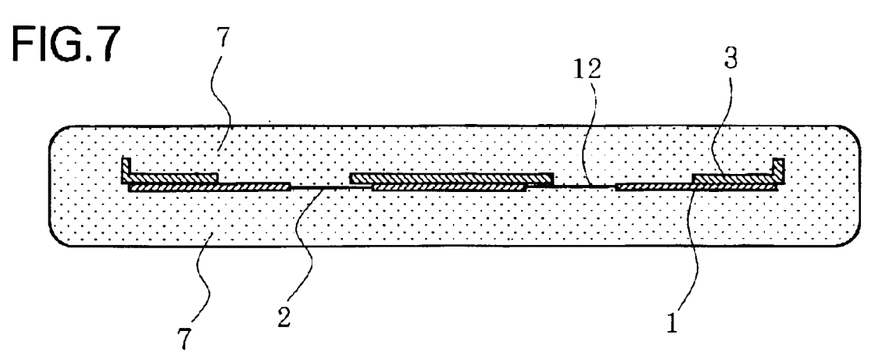
FIG. 7 is a cross-sectional view of the door according to the second embodiment of the present invention as obtained by the fabrication process of FIGS. 5 and 6.

Usable examples of the uniting sheet or film 12 can include double-tack sheets; and sheets or films made of thermoplastic resins having good fusion-bondability with polyolefins, especially polyethylene, such as low-density polyethylene, ethylene-vinyl acetate copolymer, polyvinyl acetate and low-melting polyamides. These uniting sheets or films 12 are optional in thickness. Their thickness may range, for example, from 10 $\mu$m to 0.5 mm or so. Such uniting sheets or films 12 may also be arranged on both sides of the through-hole 2 of the iron plate 1. As a still further alternative, they may be arranged at locations corresponding to plural through-holes 2. The door obtained by the fabrication process illustrated in FIGS. 5 and 6 is illustrated in FIG. 7.

Figure 8:
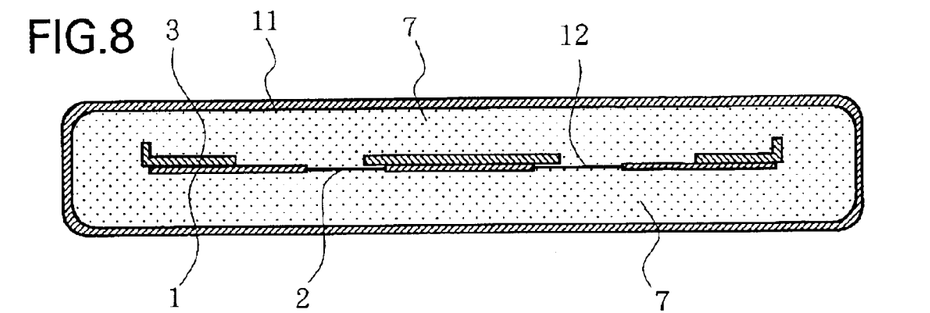
FIG. 8 is a cross-sectional view of a door according to a third embodiment of the present invention.

The third embodiment shown in FIG. 8 includes a skin 11 arranged on surfaces of expanded polyolefin plates 7,7. This skin 11 can be formed by arranging sheets or films, which serve to make up the skin 11, between the expanded polyolefin plates 7,7 and the top and bottom forces 8, 9, respectively, in the step depicted in FIG. 5 and then conducting press molding as illustrated in FIG. 6. The skin 11 is fusion-bonded to the entire outer surfaces of the expanded polyolefin plates 7,7 by heat applied upon heated pressing. As the sheets or films which are used to make up the skin 11, thermoplastic resin sheets excellent in heat resistance and strength or sheets of a woven, knitted or nonwoven fabric impregnated with a thermoplastic resin can be used. For example, sheets of a woven nylon fabric impregnated with an ethylene-vinyl acetate copolymer and commercially available under the trade name of "Eveterpolin" from K. K. Futaba Shokai can be used suitably. These sheets or films may be colored in any desired colors and/or may be printed with any desired pictures or patterns.

Figure 10:
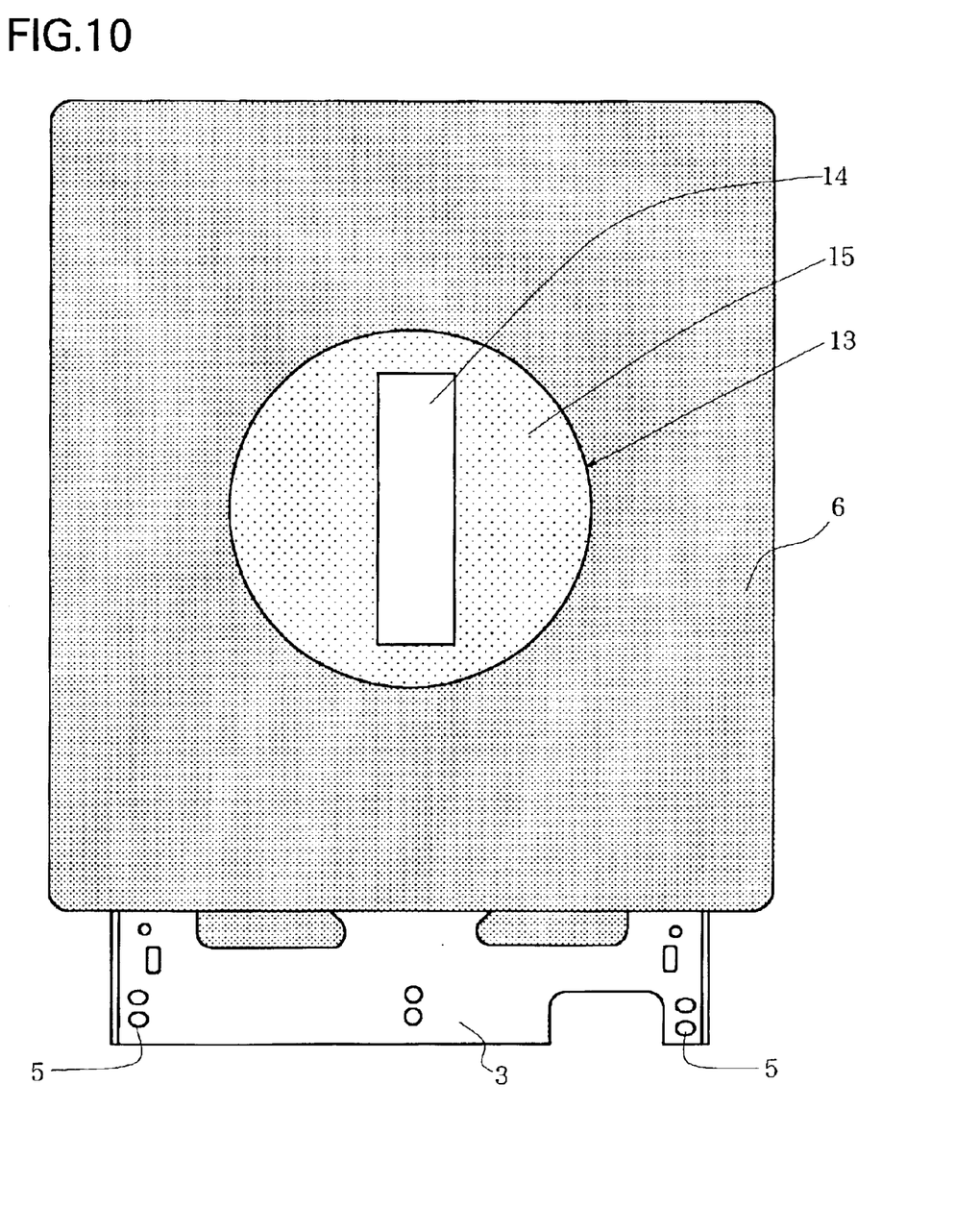
FIG. 10 is a plan view of the door according to the fourth embodiment of the present invention.

Conventional doors include those each provided on a surface thereof with a "NO ENTRY" sign 13 as illustrated in FIG. 10. According to a conventional technique, a red circle 15 with a thick white line 14 surrounded therein is formed as an example on one side of a completed door as shown in FIG. 10, although the colors of the circle 15 and thick line 14 are not limited specifically to red and white colors. Such a pattern can be formed, for example, by bonding a sticker, which has been obtained by printing the pattern on a plastic film, with an adhesive or the like. It is, however, difficult to bond the sticker unless the bonding is conducted after fully removing a mold release agent, which still remains on the surface of the door, with a solvent or the like. The conventional technique is, therefore, very complex in steps and high in cost. Moreover, even after the sticker is once bonded, the sticker is liable to separation from an end thereof.

Figure 9A:
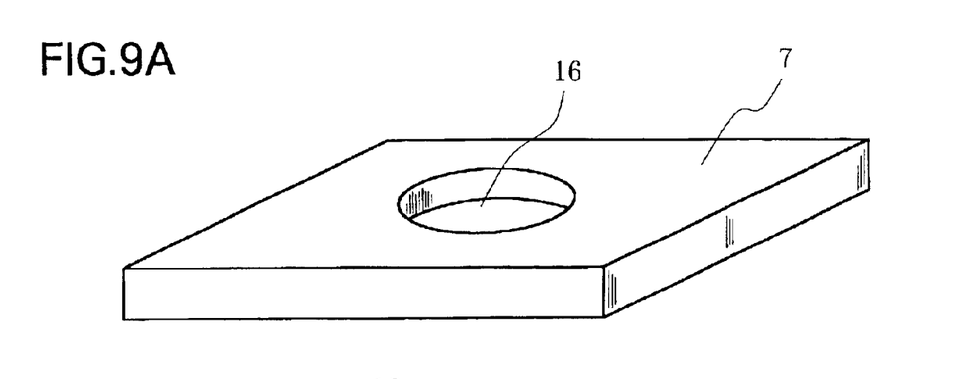
FIG. 9A through FIG. 9D are schematic perspective views of individual components of an expanded polyolefin plate for use in a door according to a fourth embodiment of the present invention.

The above-described problem of the conventional technique can also be fully overcome by the fourth embodiment of the present invention as illustrated in FIGS. 9A to 9D and FIG. 10. FIG. 9A illustrates an expanded polyolefin plate 7 for use in the present invention, which is provided at a central part thereof with a circular hole 16. Needless to say, the circular hole 16 can be formed at a desired location other than the central part. In general, the formation of the hole 16 can be easily conducted by punching. A disc-shaped block 17 depicted in FIG. 9B has been cut out by punching, for example, from an expanded polyolefin plate colored in red (not shown) This expanded polyolefin plate may preferably be made of the same material as the expanded polyolefin plate shown in FIG. 9A except for a difference in color. The disc-shaped block 17 is centrally provided with a rectangular opening 18, and has an outer diameter substantially equal to an inner diameter of the circular hole 16 depicted in FIG. 9A. A substantially rectangular parallelopipedal block 19 shown in FIG. 9C has been cut out by punching, for example, from an expanded polyolefin plate colored in white (not shown). This expanded polyolefin plate may preferably be made of the same material as the expanded polyolefin plate shown in FIG. 9A except for a difference in color. The substantially rectangular parallelopipedal block 19 has substantially the same outer dimensions as the above-described rectangular opening 18.

Figure 9B:
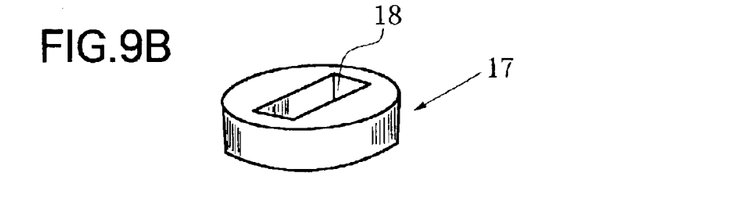
Figure 9C:
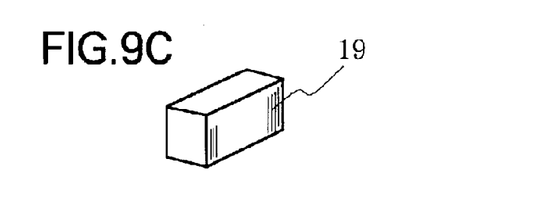
Figure 9D:
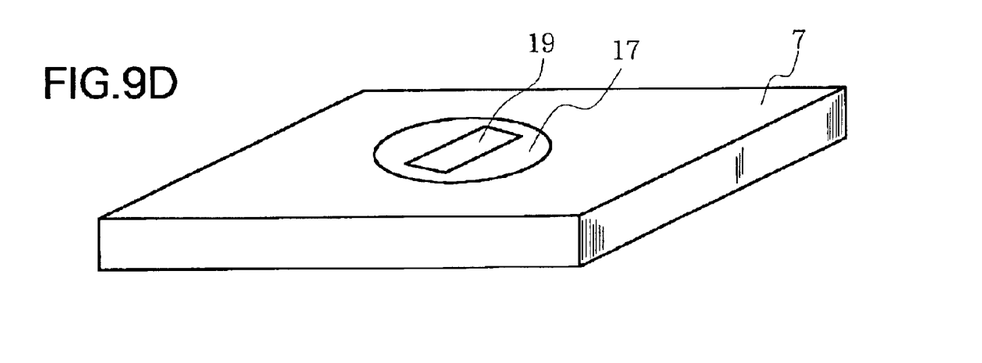

The expanded polyolefin plate 7 shown in FIG. 9D includes the disc-shaped block 17 and substantially rectangular parallelopipedal block 19, which are illustrated in FIGS. 9B and 9C, respectively, fitted in the circular hole 16 illustrated in FIG. 9A. Upon assembling the expanded polyolefin plate 7, disc-shaped block 17 and substantially rectangular parallelopipedal block 19 depicted in FIGS. 9A to 9C, respectively, an adhesive may be used to avoid their separation especially in mass fabrication, although the use of such an adhesive is not essential. Use of such expanded polyolefin films 7,7 as shown in FIG. 9D as the expanded polyolefin plates 7,7 in the processes described above with reference to FIG. 3 to FIG. 8 makes it possible to easily apply, for example, the "NO ENTRY" sign 13 to substantially central parts as illustrated in FIG. 10.

The fourth embodiment has been described taking the representative "NO ENTRY" sign 13 as an example. The shape and color of the sign 13 can, however, be chosen at will. For example, logo marks of companies or the like, other patterns or signs, characters, marks and the like can be formed likewise. According to the fourth embodiment, a desired mark or sign can be applied to a door concurrently with the fabrication of the door. The fourth embodiment, therefore, has made it possible to solve the above-described conventional problem associated with the bonding of a mark.

The iron plate employed in each of the third and fourth embodiments shown in FIGS. 8 and 10 was about 1.2 mm in thickness, 28.7 cm in width and 19.4 cm in height, defined 11 through-holes of 5 cm in diameter in total, and had the shape depicted in FIGS. 1 and 2. Needless to say, these dimensions and shapes are merely illustrative, and therefore, the present invention should not be limited to such illustrative dimensions and shapes. The expanded polyolefin plates employed in the above embodiments were expanded polyethylene plates, each of which was 3 cm in thickness and had an expansion ratio of 25 times. Those expanded polyolefin plates each had a thickness of about 2.6 cm and an expansion ratio of 8 times after press molded as illustrated in FIG. 3 or FIG. 5.

The doors of the third and fourth embodiments shown in FIGS. 8 and 10 were each about 0.7 kg in total weight, whereas the weight of the conventional door of the same dimensions depicted in FIG. 11 was 1.3 kg. As appreciated from this difference in weight, each door according to the present invention has advantageous effects such that it is significantly lighter in weight than the conventional doors, can substantially reduce a load exerted on the equipment and like arranged at a ticket gate owing to its lighter weight, and hence, can considerably reduce troubles on the equipment and the like.

The expanded polyolefin plates described above are expanded polyethylene plates. Needless to say, other expanded polyolefin plates such as expanded polypropylene plates can also be used as expanded polyolefin plates. Further, the thickness, expansion ratio and the like of each expanded polyolefin plate are not limited to the corresponding values in the above-described embodiments. Preferably, each expanded polyolefin plate may range, for example, from about 1 to 20 cm in thickness, and may have an expansion ratio, for example, in a range of from about 3 to 40 before press molding and an expansion ratio, for example, in a range of from about 2 to 15 times.

The above description was made primarily with respect to ticket gates at railway stations. Doors according to the present invention are also useful as doors for ticket gates at airports, harbors, play grounds, zoos, aquariums, movie theaters, museums, sports stadiums, halls or sites such as baseball stadiums, halls or sites for entertainments or exhibitions, and other institutions or facilities.

What is claimed is:

1. A door for a ticket gate, said door comprising a metal plate and a cushioning material covering said metal plate, wherein said metal plate defines at least one through-hole therein, said cushioning material comprises expanded polyolefin plates, and said metal plate and said expanded polyolefin plates have been integrated together by arranging said polyolefin plates on opposite sides of said metal plate, respectively, and wherein at least one of said expanded polyolefin plates defines a hole at a part thereof, and an expanded polyolefin block that is inserted in said hole such that said at least one expanded polyolefin plate and said expanded polyolefin block are integrated together.

2. A door according to claim 1, wherein said expanded polyolefin plates are selected from the group consisting of expanded polyethylene plates and expanded polypropylene plates.

3. A door according to claim 1, wherein said expanded polyolefin plates have an expansion ratio of from 3 to 40 times before said press molding and an expansion ratio of from 2 to 15 times after said press molding.

4. A door according to claim 1, wherein said expanded polyolefin plates arranged on said opposite sides of said metal plate are united together through said at least one through-hole, which is defined in said metal plate, without fusion bonding to their corresponding surfaces of said metal plate.

5. A door according to claim 1, wherein said expanded polyolefin plates arranged on said opposite sides of said metal plate are adhered together through said at least one through-hole, which is defined in said metal plate, without fusion bonding to their corresponding surfaces of said metal plate.

6. A door according to claim 1, wherein said expanded polyolefin plates arranged on said opposite sides of said metal plate are fusion-bonded together through said at least one through-hole, which is defined in said metal plate, without fusion bonding to their corresponding surfaces of said metal plate.

7. A door according to claim 1, wherein said cushioning material is integrally covered at a surface thereof with a skin selected from the group consisting of a thermoplastic resin layers, a woven fabric impregnated with a thermoplastic resin, a knitted fabric impregnated with a thermoplastic resin and a nonwoven fabric impregnated with a thermoplastic resin.

8. A door according to claim 1, wherein said metal plate is an iron plate.

9. A door for a ticket gate, said door being composed of a metal plate as a core material and a cushioning material covering said metal plate, wherein said metal plate defines at least one through-hole therein, said cushioning material comprises expanded polyolefin plates, and said metal plate and said expanded polyolefin plates have been integrated together by arranging said polyolefin plates on opposite sides of said metal plate, respectively, and then press molding said metal plate and said expanded polyolefin plates together, wherein at least one of said expanded polyolefin plates defines a hole at a part thereof, and an expanded polyolefin block which is the same in shape and dimensions as said hole and is different in color from said at least one expanded polyolefin plate is inserted in said hole such that said at least one expanded polyolefin plate and said expanded polyolefin block are integrated together.

10. A door for a ticket gate, said door being composed of a metal plate as a core material and a cushioning material covering said metal plate, wherein said metal plate defines at least one through-hole therein, said cushioning material comprises expanded polyolefin plates, and said metal plate and said expanded polyolefin plates have been integrated together by arranging said polyolefin plates on opposite sides of said metal plate, respectively, and then press molding said metal plate and said expanded polyolefin plates together, wherein said expanded polyolefin plates arranged on said opposite sides of said metal plate are united together through said at least one through-hole, which is defined in said metal plate, by a uniting sheet selected from the group consisting of a double-tack sheet and a thermoplastic resin sheet without fusion bonding to their corresponding surfaces of said metal plate.

11. A door for a ticket gate, said door comprising a metal plate and a cushioning material covering said metal plate, wherein said metal plate defines at least one through-hole therein, said cushioning material comprises expanded polyolefin plates, and said metal plate and said expanded polyolefin plates have been integrated together by arranging said polyolefin plates on opposite sides of said metal plate, respectively, and wherein said expanded polyolefin plates are united together through said at least one through-hole by a uniting sheet.

* * * * *